(12) United States Patent
Shlain et al.

(10) Patent No.: US 8,315,453 B2
(45) Date of Patent: Nov. 20, 2012

(54) DEFECT CLASSIFICATION WITH OPTIMIZED PURITY

(75) Inventors: Vladimir Shlain, Haifa (IL); Assaf Glazer, Kiryat-Ono (IL)

(73) Assignee: Applied Materials Israel, Ltd., Rehovot (IL)

( * ) Notice: Subject to any disclaimer, the term of this patent is extended or adjusted under 35 U.S.C. 154(b) by 0 days.

(21) Appl. No.: 12/844,724

(22) Filed: Jul. 27, 2010

(65) Prior Publication Data

US 2012/0027285 A1  Feb. 2, 2012

(51) Int. Cl.
*G06K 9/00* (2006.01)
(52) U.S. Cl. ........................................... 382/149
(58) Field of Classification Search .......... 382/141–152, 382/155–159, 181, 190, 209, 217–222, 224–228, 382/309; 348/86–88, 92, 125–130; 706/15, 706/20, 900
See application file for complete search history.

(56) References Cited

U.S. PATENT DOCUMENTS

| | | | |
|---|---|---|---|
| 6,256,093 B1 | 7/2001 | Ravid et al. | |
| 6,650,779 B2 * | 11/2003 | Vachtesvanos et al. | 382/228 |
| 6,922,482 B1 * | 7/2005 | Ben-Porath | 382/149 |
| 6,999,614 B1 * | 2/2006 | Bakker et al. | 382/159 |

OTHER PUBLICATIONS

Vapnik, Vladimir N., Section 5.4 The Optimal Separating Hyperplane, The Nature of Statistical Learning Theory, Statistics for Engineering and Information Science, Second Edition, © 2000, 1995 Springer-Verlag, New York, Inc., pp. 131-163.
Chih-Chung Chang and Chih-Jen Lin, "LIBSVM: A Library for Support Vector Machines," National Taiwan University (2001), updated Mar. 6, 2010, pp. 1-30.
Assaf Glazer and Moshe Sipper, "Evolving an Automatic Defect Classification Tool," EvoWorkshops 2008, LNCS 4974 (Springer-Verlag, 2008), pp. 194-203.
LIBSVM—A Library for Support Vector Machines, as downloaded from www.csie.ntu.edu.tw/~cjlin/libsvm on Jul. 27, 2010.
Schölkopf, Bernhard et al., "New Support Vector Algorithms," Neural Computation 12 (2000), Massachusetts Institute of Technology, pp. 1207-1245.

* cited by examiner

*Primary Examiner* — Jose Couso
(74) *Attorney, Agent, or Firm* — Lowenstein Sandler PC

(57) ABSTRACT

A method for defect analysis includes identifying single-class classifiers for a plurality of defect classes, the plurality of defect classes characterized by respective ranges of inspection parameter values. Each single-class classifier is configured for a respective class to identify defects belonging to the respective class based on the inspection parameter values, while identifying the defects not in the respective class as unknown defects. A multi-class classifier is identified that is configured to assign each defect to one of the plurality of the defect classes based on the inspection parameter values. Inspection data is received, and both the single-class and multi-class classifiers are applied to the inspection data to assign the defect to one of the defect classes.

46 Claims, 8 Drawing Sheets

DEFECT CLASSIFICATION WITH OPTIMIZED PURITY

FIELD OF THE INVENTION

The present invention relates generally to automated inspection, and specifically to methods and systems for analysis of manufacturing defects.

BACKGROUND OF THE INVENTION

Automatic Defect Classification (ADC) techniques are widely used in inspection and measurement of defects on patterned wafers in the semiconductor industry. The objective of these techniques is not only to detect the existence of defects, but to classify them automatically by type, in order to provide more detailed feedback on the production process and reduce the load on human inspectors. ADC is used, for example, to distinguish among types of defects arising from particulate contaminants on the wafer surface and defects associated with irregularities in the microcircuit pattern itself, and may also identify specific types of particles and irregularities.

Various methods for ADC have been described in the patent literature. For example, U.S. Pat. No. 6,256,093, whose disclosure is incorporated herein by reference, describes a system for on-the-fly ADC in a scanned wafer. A light source illuminates the scanned wafer so as to generate an illuminating spot on the wafer. Light scattered from the spot is sensed by at least two spaced-apart detectors, and is analyzed so as to detect defects in the wafer and classify the defects into distinct defect types.

As another example, U.S. Pat. No. 6,922,482, whose disclosure is incorporated herein by reference, describes a method and apparatus for automatically classifying a defect on the surface of a semiconductor wafer into one of a number of core classes, using a core classifier employing boundary and topographical information. The defect is then further classified into a subclass using a specific adaptive classifier that is associated with the core class and trained to classify defects from only a limited number of related core classes. Defects that cannot be classified by the core classifier or the specific adaptive classifiers are classified by a full classifier.

Various mathematical techniques have been applied in ADC schemes. For example, Glazer and Sipper describe an evolutionary classification tool, based on genetic algorithms (GAs), in "Evolving an Automatic Defect Classification Tool," EvoWorkshops 2008, LNCS 4974 (Springer-Verlag, 2008), pages 194-203, which is incorporated herein by reference. The article shows that GA-based models can attain better classification performance, with lower complexity, than human-based and heavy random search models.

Automatic defect classification (ADC) systems are commonly calibrated using a set of training data, containing a collection of defects that have been pre-classified by a human expert. The ADC system uses the training data in order to set respective ranges of parameter values that are associated with each defect class in a multi-dimensional parameter space (also referred to as a hyperspace when classification involves more than three parameters). In most existing systems, these settings are then tested and adjusted to optimize their accuracy, which is defined as the percentage of all defects that are classified correctly.

In many ADC applications, however, purity of classification is a more meaningful measure of system operation. The system operator may specify a certain maximum rejection rate, i.e., a percentage of the defects that the ADC system is unable to classify with confidence and therefore returns to the system operator for classification by a human expert. "Purity" refers to the percentage of the remaining defects—those found by the ADC system to be classifiable and not rejected—that are classified correctly. Since it is realistic to assume that there will always be some percentage of defects that is rejected by the ADC system, purity is the measure that is actually of greatest concern to the operator.

Purity of classification can be affected by various kinds of classification uncertainty. In some cases, the parameter values associated with a defect may fall in a region of overlap between two (or more) different classes. In others, the parameter values of the defect may lie at the outer borders of the range associated with a given class.

DETAILED DESCRIPTION OF EMBODIMENTS

Figure 1A:
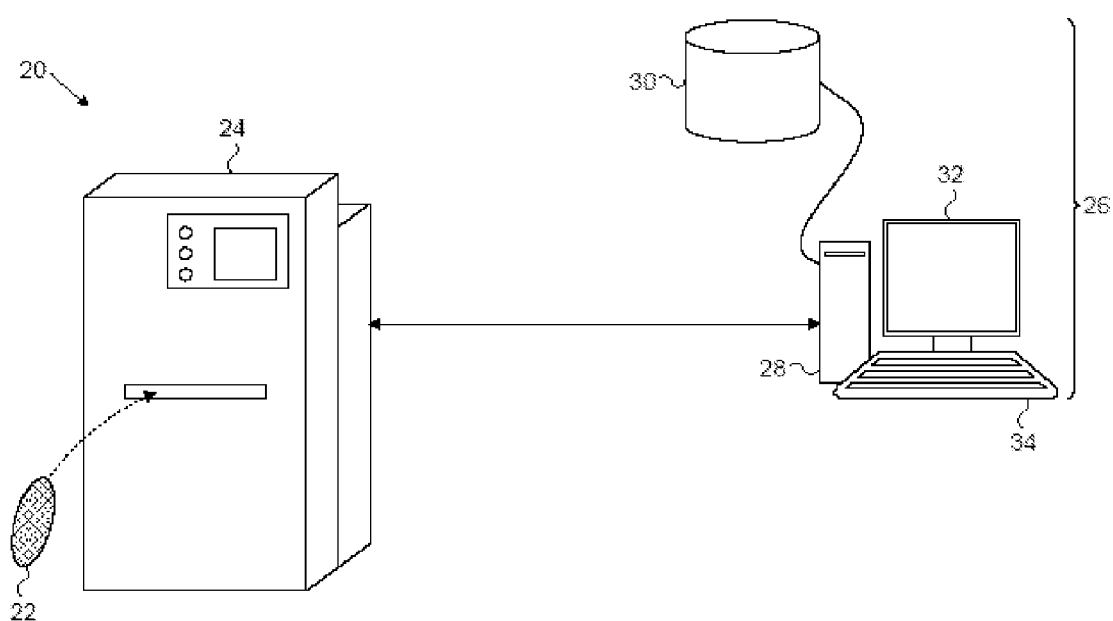
FIG. 1A is a schematic, pictorial illustration of a defect inspection and classification system, in accordance with an embodiment of the present invention.

Embodiments of the present invention that are described herein provide improved methods, systems and software for automated classification of defects based on inspection data.

There is therefore provided, in accordance with an embodiment of the present invention, a method for defect analysis, including defining a plurality of defect classes, characterized by respective ranges of inspection parameter values. Respective single-class classifiers are specified for the defect classes, each single-class classifier being configured for a respective class to identify defects belonging to the respective class based on the inspection parameter values, while identifying the defects not in the respective class as unknown defects. A multi-class classifier, configured to assign each defect to one of the plurality of the defect classes based on the inspection parameter values, is also specified. Inspection data are received with respect to a defect found in a sample. Both the single-class and multi-class classifiers are automatically applied to the inspection data, using a computer, so as to assign the defect to one of the defect classes.

The multi-class classifier may be configured to identify the defects in an overlap region between the respective ranges of at least two of the defect classes as non-decidable defects, and both the unknown defects and the non-decidable defects are rejected from classification. Additionally or alternatively, specifying the respective single-class and multi-class classifiers includes jointly setting respective confidence thresholds for distinguishing between known and unknown defects and between decidable and non-decidable defects, and setting the respective confidence thresholds includes adjusting the confidence thresholds so as to achieve a specified purity target in classification of the defects.

In one embodiment, automatically applying both the single-class and multi-class classifiers includes classifying the defect in a given defect class using the multi-class classifier, and verifying that the defect is classified as a known defect by the single-class classifier for the given defect class.

In a disclosed embodiment, specifying the multi-class classifier includes defining a plurality of decision planes for distinguishing between the respective ranges of the parameter values in a parameter hyperspace for different pairs of the defect classes, and applying the multi-class classifier includes aggregating multiple binary decisions made with respect to the decision planes. Defining the decision planes may include, for each pair of the defect classes, applying a binary linear support vector machine in order to find a plane giving a maximal separation of the classes in the pair.

Additionally or alternatively, specifying the respective single-class classifiers includes defining a one-class support vector machine to distinguish between the defects in a given class and the defects that are classified as unknown defects with respect to the given class. In a disclosed embodiment, defining the one-class support vector machine includes mapping the inspection data to a hypersphere in a parameter hyperspace, and finding a hyperplane that cuts the hypersphere so as to define a hyperspherical cap containing the defects to be classified as belonging to the given class.

There is also provided, in accordance with an embodiment of the present invention, a method for analyzing defects, including defining a plurality of defect classes and receiving a training set including inspection data with respect to defects that have been classified as belonging to respective defect classes. One or more computerized classifiers are trained using the training set so as to define a respective range of inspection parameter values that characterizes each defect class and, using the parameter values, to classify each defect as belonging to a respective class with a respective level of confidence. A confidence threshold for rejection of defect classifications having low levels of confidence is adjusted so as to achieve a specified purity target in classification of the training set. The trained classifiers with the adjusted confidence threshold are applied to further inspection data outside the training set.

In some embodiments, training the one or more computerized classifiers includes training a plurality of classifiers, having respective confidence thresholds that are jointly adjusted so as to balance a purity of the classification against a rejection rate. In a disclosed embodiment, the plurality of the classifiers include a multi-class classifier, having a first confidence threshold such that the defects classified by the multi-class classifier as falling below the first confidence threshold are identified as non-decidable defects, and at least one single-class classifier, having a second confidence threshold such that defects classified by the at least one single-class classifier as falling below the second confidence threshold are identified as unknown defects. Adjusting the confidence threshold may include maximizing the purity of the classification of the training set while keeping the rejection rate no greater than a predetermined maximum.

In a disclosed embodiment, training the one or more computerized classifiers includes dividing the training set into multiple folds, deriving the range of inspection parameter values based on a training subset of the folds, and testing the derived range on a testing subset of the folds, disjoint from the training subset. The steps of deriving and testing are repeated over multiple, different training and testing subsets of the folds.

There is additionally provided, in accordance with an embodiment of the present invention, apparatus for defect analysis, including a memory, configured to store respective ranges of inspection parameter values for a plurality of defect classes. A processor is configured to receive inspection data with respect to a defect found in a sample, and to apply both single-class and multi-class classifiers to the inspection data, based on the inspection parameter values, so as to assign the defect to one of the defect classes. Each single-class classifier is configured for a respective class to identify defects belonging to the respective class, while identifying the defects not in the respective class as unknown defects, and the multi-class classifier is configured to assign each defect to one of the plurality of the defect classes.

There is further provided, in accordance with an embodiment of the present invention, apparatus for analyzing defects, including a memory, which is configured to store information with respect to a plurality of defect classes. A processor is configured to receive a training set including inspection data with respect to defects that have been classified as belonging to respective defect classes, to train one or more classifiers using the training set so as to define a respective range of inspection parameter values that characterizes each defect class and, using the parameter values, to classify each defect as belonging to a respective class with a respective level of confidence, to adjust a confidence threshold for rejection of defect classifications having low levels of confidence so as to achieve a specified purity target in classification of the training set, and to apply the trained classifiers with the adjusted confidence threshold to further inspection data outside the training set.

There is moreover provided, in accordance with an embodiment of the present invention, a computer software product, including a computer-readable medium in which program instructions are stored, which instructions, when read by a computer, cause the computer to store respective ranges of inspection parameter values for a plurality of defect classes, to receive inspection data with respect to a defect found in a sample, and to apply both single-class and multi-class classifiers to the inspection data, based on the inspection parameter values, so as to assign the defect to one of the defect classes, wherein each single-class classifier is configured for a respective class to identify defects belonging to the respective class, and the multi-class classifier is configured to assign each defect to one of the plurality of the defect classes, while the defects not in the respective class of any single-class classifier are classified as unknown defects.

There is furthermore provided, in accordance with an embodiment of the present invention, a computer software product, including a computer-readable medium in which program instructions are stored, which instructions, when read by a computer, cause the computer to store information with respect to a plurality of defect classes, to receive a training set including inspection data with respect to defects that have been classified as belonging to respective defect classes, to train one or more classifiers using the training set so as to define a respective range of inspection parameter values that characterizes each defect class and, using the parameter values, to classify each defect as belonging to a respective class with a respective level of confidence, to adjust a confidence threshold for rejection of defect classifications having low levels of confidence so as to achieve a specified purity target in classification of the training set, and to apply the trained classifiers with the adjusted confidence threshold to further inspection data outside the training set.

Embodiments of the present invention that are described herein deal with classification uncertainty by applying multiple different classifiers to the inspection data, either sequentially or in parallel. For each defect class, a single-class classifier identifies defects belonging to the respective class, while identifying the defects not in the respective class as unknown defects. In addition, a multi-class classifier looks at multiple defect classes together and assigns each defect to one of the classes, while identifying defects in overlap areas between the classes as non-decidable defects. The single-class and multi-class classifiers are used together in classifying defects with high purity. The extent of the outer borders and overlap areas of the different classes can be adjusted—by means of variable confidence thresholds—in order to maximize purity while keeping the rejection rate no greater than a predefined limit.

In the embodiments described below, the respective confidence thresholds for the single-class classifiers (to distinguish between known and unknown defects) and for the multi-class classifier (to distinguish between decidable and non-decidable defects) are adjusted in a training process. In this process, the training set may be divided into multiple folds, i.e., different groups of defects. One or more of the folds are selected to serve as a training subset, while the remaining fold or folds serve as the testing subset, which may be disjoint from the training subset. The single- and multi-class classifiers are trained together on the training subset in order to derive the ranges of inspection parameter values that are associated with each class. The results are tested for validation on the testing subset. These steps can then be repeated for the single- and multi-class classifiers together over multiple, different training and testing subsets of the folds.

The result of this training process is a definition of the respective range of inspection parameter values that characterizes each defect class, along with a confidence measure that gives the level of confidence associated with each single-class or multi-class classification of a defect as a function of the location of the parameter values of the defect in the parameter space. The confidence thresholds for rejection of defect classifications having low levels of confidence can then be adjusted, either automatically or under operator control, so as to achieve a desired purity target and rejection rate in classification of the training set. The trained classifiers with these confidence thresholds are then applied in classifying actual production defects whose classification is not known a priori.

FIG. 1A is a schematic, pictorial illustration of a system 20 for automated defect inspection and classification, in accordance with an embodiment of the present invention. A sample, such as a patterned semiconductor wafer 22, is inserted into an inspection machine 24. This machine may comprise, for example, a scanning electron microscope (SEM) or an optical inspection device or any other suitable sort of inspection apparatus that is known in the art. Machine 24 may scan the surface of wafer 22, sense and process the scan results, and output inspection data. These data comprise a list of defects found on the wafer, including the location of each defect, along with values of inspection parameters associated with each defect. The inspection parameters may include, for example, the size, shape, scattering intensity, directionality, and/or spectral qualities, and/or any other suitable parameters that are known in the art.

In one embodiment, an ADC machine 26 hosts an ADC manager that receives and processes the inspection data output by inspection machine 24. Although ADC machine 26 is shown in FIG. 1A as being connected directly to the inspection machine output, the ADC machine may, alternatively or additionally, operate on pre-acquired, stored inspection data. As another alternative, the functionality of the ADC machine may be integrated into the inspection machine.

One embodiment of an ADC manager will be discussed in greater detail below in conjunction with FIG. 1B.

ADC machine 26 may be a personal computer, server computer, router, etc. In one embodiment, ADC machine 26 comprises a general-purpose computer, comprising a processor 28 with a memory 30 for holding defect information and classification parameters, along with a user interface comprising a display 32 and input device 34. Processor 28 may execute instructions that cause it to carry out the functions that are described herein below. The software may be downloaded to the processor in electronic form, over a network, for example, or it may, alternatively or additionally, be stored in a tangible, non-transitory computer-readable storage medium. A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

The computer implementing the functions of machine 26 may be dedicated to ADC functions, or it may perform additional computing functions, as well. As another alternative, at least some of the functions of the ADC machine 26 described herein below may be performed by dedicated or programmable hardware logic.

ADC machine 26 runs multiple classifiers, including both single-class and multi-class classifiers, as defined above. The embodiments that follow will be described, for the sake of illustration and clarity, with reference to machine 26 and the other elements of system 20, but the principles of these embodiments may likewise be implemented, mutatis mutandis, in any sort of classification system that is called on to handle multiple classes of defects or other unknown features.

Figure 1B:
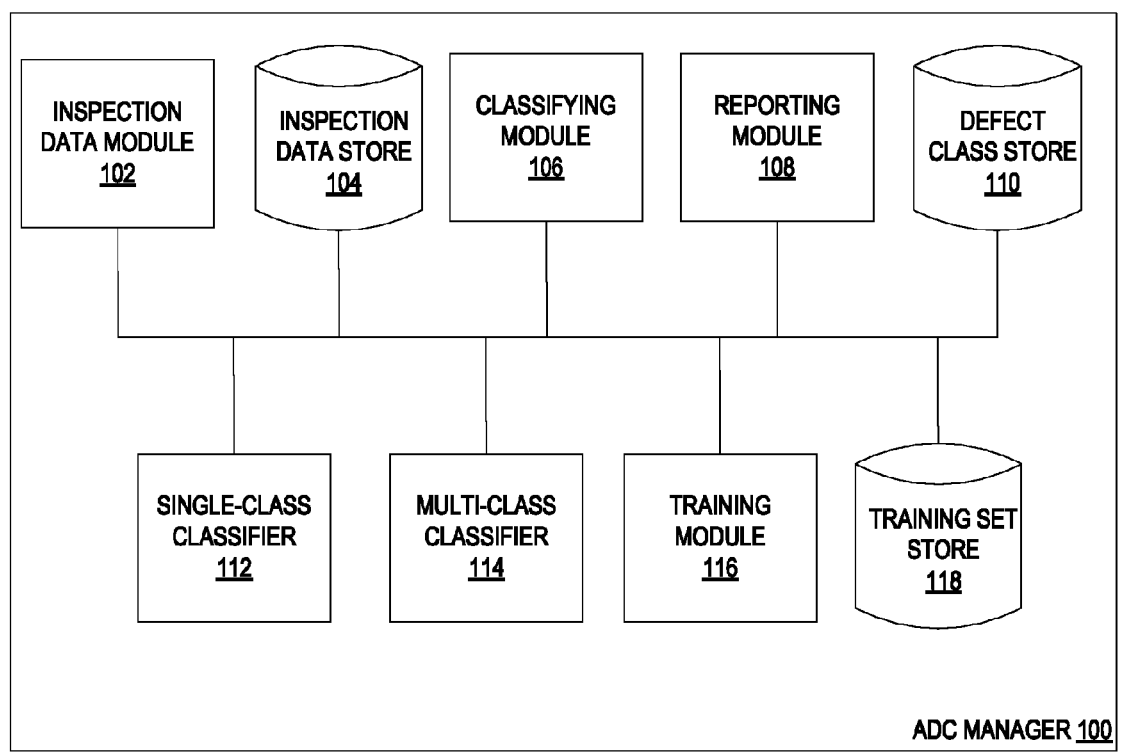
FIG. 1B is a block diagram of an ADC manager in accordance with an embodiment of the present invention.

FIG. 1B is a block diagram of one embodiment of an ADC manager 100. ADC manager 100 may include an inspection data module 102, an inspection data store 104, a classifying module 106, a reporting module 108, a defect class store 110, a single-class classifier 112, a multi-class classifier 114, a training module 116, and a training set store 118.

Inspection data module 102 receives inspection data output for processing and stores it in an inspection data store 104. The inspection data may include a list of defects and relevant defect parameters that were identified during inspection of a wafer. In one embodiment, the data may be received from an inspection machine such as inspection machine 24 of FIG. 1.

Classifying module 106 classifies defects that are identified in the received inspection data. Classifying module 106 may classify the defects by applying single-class classifier 112 and multi-class classifier 114 to the defects. Classifying module 106 may apply the single-class classifier and multi-class classifier in parallel. Alternatively, classifying module 106 may apply the classifiers sequentially.

Single-class classifier 112 and multi-class classifier 114 may classify the defects using defect class information stored in defect class store 110. Defect class store 110 may store information defining multiple defect classes, with each class being characterized by respective rangers of inspection parameter values.

Reporting module 108 may output the results of the classification performed by the classifying module 106. This output may be in the form of a graphical user interface, a report, a user notification, etc.

Training module 116 may use a training set that is stored in training set store 118 to train classifiers 112 and 114 in order to define a range of parameter values that characterize each defect class and to enable them to classify defects as belonging to one of the defect classes with a particular confidence level.

Figure 2A:
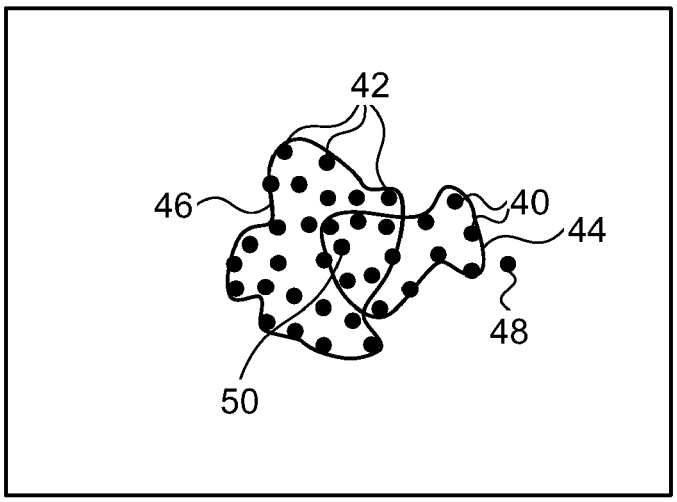
FIGS. 2A-2C are schematic representations of a set of defects in a parameter space, illustrating criteria used in classification of the defects in accordance with an embodiment of the present invention.

FIG. 2A is a schematic representation of a parameter space to which a set of defects 40, 42 is mapped, in accordance with an embodiment of the present invention. For the sake of visual simplicity, the parameter space is represented in FIG. 2A and in subsequent figures as being two-dimensional, but the classification processes that are described herein are commonly carried out in spaces of higher dimensionality. The defects in FIG. 2A are assumed to belong to two different classes, one associated with defects 40, and the other with defects 42. Defects 40 are bounded in the parameter space by a border 44, while defects 42 are bounded by a border 46. The borders may overlap, as shown in the figure.

In this example, ADC machine 26 is called on to classify two defects of uncertain types:

- A defect 48 is much closer to the region of defects 40 than to that of defects 42, and therefore has a higher likelihood of belonging to the class of defects 40. A multi-class classifier would therefore assign defect 48 to the class of defects 40, but a single-class classifier for this class will note that defect 48 falls outside border 44 and may therefore identify defect 48 as unknown.
- A defect 50 falls in the overlap region between borders 44 and 46. The single-class classifiers for the respective classes of defects 40 and 42 will both identify defect 50 as a known class member, but the multi-class classifier may identify defect 50 as non-decidable.

Figure 2B:
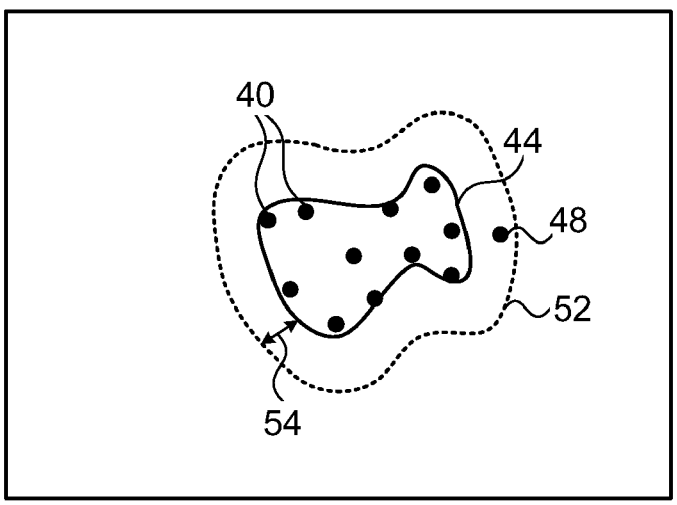

FIG. 2B is a schematic representation of the parameter space of defects 40, illustrating how the single-class classifier will handle defect 48, in accordance with an embodiment of the present invention. Although boundary 44 is shown conceptually as a solid line, in fact the bounds of the region containing defects 40 are the result of statistical estimation. The bounds may be larger or smaller depending on the threshold confidence level that is chosen in order to distinguish between defects that are identified as belonging to the class and those that are classified as "unknown." Boundary 44 is the smallest bound that encompasses all of defects 40 that are known to belong to the class, on the basis of prior training. (Methods for finding this bound are described below with reference to FIG. 5.)

Figure 7B:
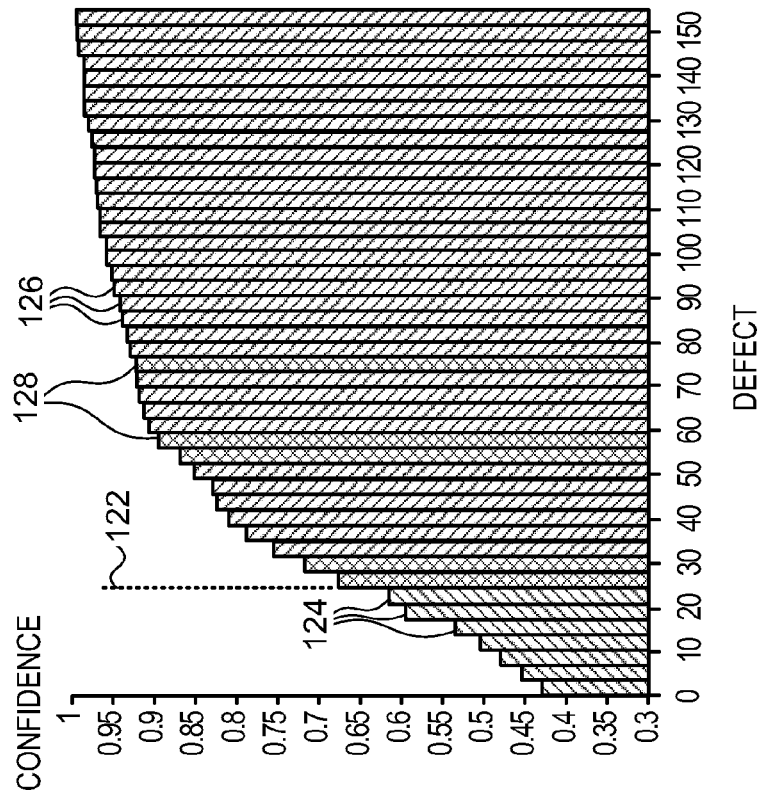
FIGS. 7A and 7B are bar plots that schematically illustrate defect classification results and confidence thresholds, in accordance with an embodiment of the present invention.
Figure 7A:
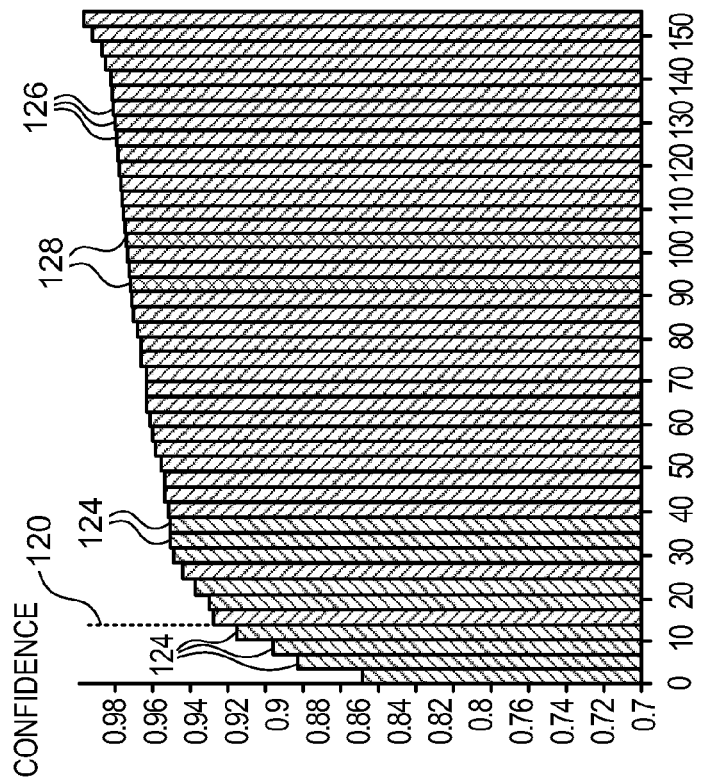

By relaxing the threshold confidence level for inclusion of defect 48 in the class of defects 40, a broader boundary 52 is established, at a certain distance 54 from boundary 44. Boundary 52 contains defect 48, which will therefore be found by this single-class classifier to be a member of the class, rather than unknown. Adjusting the confidence level thus decreases the number of defects that are rejected by ADC machine 26, although it may adversely affect the purity of classification if defect 48 does not, in fact, belong to the class in question. The location of boundary 52 is adjusted as part of a purity optimization process, which is illustrated in FIGS. 7A and 7B.

Figure 2C:
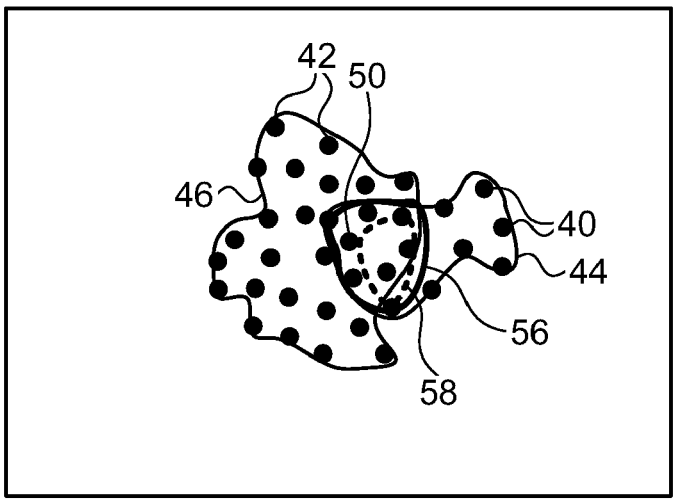

FIG. 2C is a schematic representation of the parameter space of FIG. 2A, illustrating how the multi-class classifier will handle defect 50. A border 56 shows the extent of the overlap region between borders 44 and 46 assuming that a high confidence threshold is set for distinguishing between classified and non-decidable defects. On this basis, ADC machine 26 will reject defect 50 as non-decidable.

On the other hand, if the confidence threshold is relaxed, the overlap region effectively shrinks to within a smaller border 58. Now defect 50 may be classified in the class of defects 42, since statistically it has a higher probability of belonging to this class. The confidence thresholds for the single-class and multi-class classifiers may be optimized jointly in order to meet the desired purity and rejection targets.

Figure 3:
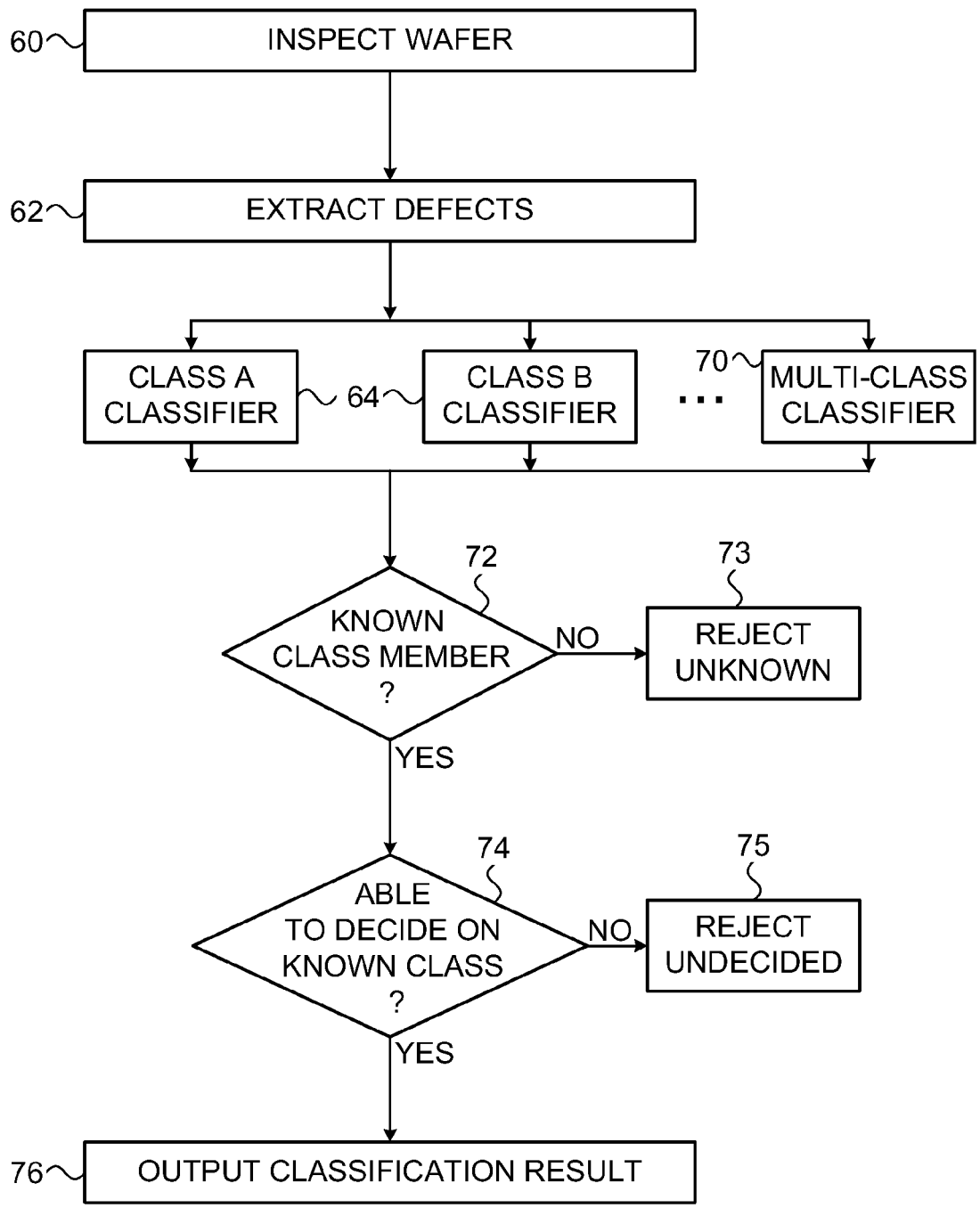
FIG. 3 is a flow chart that schematically illustrates a method for defect classification, in accordance with an embodiment of the present invention.

FIG. 3 is a flow chart that schematically illustrates a method for defect classification, in accordance with an embodiment of the present invention. The method may be performed by processing logic that may comprise hardware (e.g., circuitry, dedicated logic, programmable logic, microcode, etc.), software (e.g., instructions run on a processing device to perform hardware simulation), or a combination thereof.

This method assumes that a multi-class classifier and one or more single-class classifiers have been trained to recognize the defect classes in question, and that the confidence thresholds of the classifiers have been set. Methods that may be used for such training and threshold setting are described below.

Inspection machine 24 inspects wafer 22, at a wafer inspection step 60. The inspection machine extracts a list of defects and relevant defect parameters using methods of image processing that are known in the art, at a defect extraction step 62. ADC machine 26 applies multiple classifiers to the listed defects: one or more single-class classifiers 64 and a multi-class classifier 70. In FIG. 3, by way of example, single-class classification and multi-class classification are presented as parallel processes, but these steps may alternatively take place in order (multi-class before single-class or single-class before multi-class).

A respective single-class classifier 64 is defined for each defect class of interest, shown in the figure as Class A, Class B. Each such classifier determines, based on the parameter values provided for each defect, whether the defect is a member of the corresponding class or, alternatively, whether it should be classified as an "unknown" defect with respect to that class. Multi-class classifier 70 decides to which class each one of the defects belongs, with the corresponding confidence level.

ADC machine 26 then checks each defect to verify that it is a member of at least one known class, at a membership verification step 72. Defects that are unknown with respect to all classes that have been evaluated are rejected, at an unknown defect rejection step 73. In addition, for each defect, ADC machine 26 checks whether the multi-class classifier was able to reach a clear decision placing the defect in the region of a particular class, or whether the defect falls in an overlap area between two or more class regions, at a decision checking step 74. When the multi-class classifier has placed the defect in a given defect class, the ADC machine verifies that the defect was classified as a known defect by the single-class classifier for that defect class, i.e., the multi-class and single-class decisions are required to be in agreement. Defects in the overlap area between classes are rejected as non-decidable, at an undecided defect rejection step 75.

As noted above, the boundaries of the single-class regions used by classifiers 64 and the overlap areas used by classifier 70 are elastic and depend on operator-defined confidence thresholds. These thresholds thus control the numbers of defects that are rejected at steps 72 and 74.

ADC machine 26 outputs the classification results, at a classification output step 76. These results identify the class to which each known, decidable defect belongs, and may also list the defects that were rejected from the automatic classification process. The operator may inspect the rejected defects visually in order to classify them. Alternatively or additionally, the operator may readjust the confidence bounds and then repeat the classification process.

Figure 4:
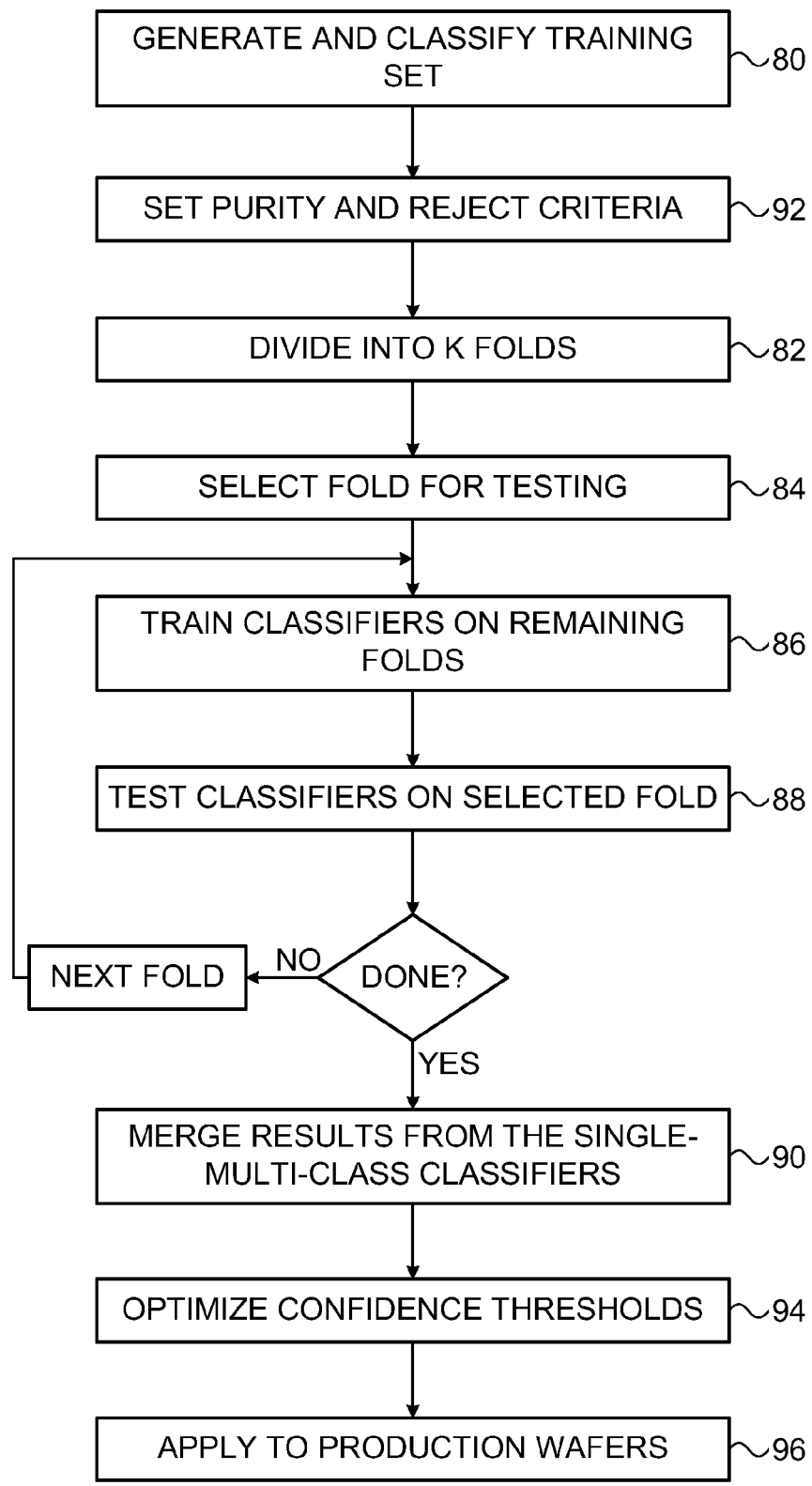
FIG. 4 is a flow chart that schematically illustrates a method for training a defect classification system, in accordance with an embodiment of the present invention.

FIG. 4 is a flow chart that schematically illustrates a method for training ADC machine 26, in accordance with an embodiment of the present invention. The method may be performed by processing logic that may comprise hardware (e.g., circuitry, dedicated logic, programmable logic, microcode, etc.), software (e.g., instructions run on a processing device to perform hardware simulation), or a combination thereof.

As a precursor to the training, a set of training data is prepared, at a training set generation step 80. The training set may comprise a group of actual defects and corresponding parameter values extracted by inspection machine 24. For efficient computation, the parameter values may be normalized, so that all parameters have the same range. Each defect in the training set is pre-classified, sometimes by a human expert. These training data are input to the ADC machine. At step 92, purity and rejection criteria are set. In one embodiment, the purity and rejection criteria are provided by a system operator.

ADC machine 26 carries out a process of supervised learning with k-fold cross-validation in order to find the bounds, in parameter space, to be used by single-class and multi-class classifiers 64 and 70 (FIG. 3). For this purpose, the training set is divided into a number, k, of disjoint subsets, referred to as "folds," at a fold division step 82. Any suitable number of folds may be used, two or greater, depending on the size of the training set and the time to be invested in the training process. The training method is applied to the single-class and multi-class classifiers together, using the same fold division for all classifiers. For consistent results, it is desirable that all folds contain approximately the same distribution of defect classes.

ADC machine 26 initially selects one fold for testing, at a fold selection step 84. The remaining folds are used to train the single-class and multi-class classifiers, at a training step 86. At this step, the ADC machine finds the optimal bound in parameter space, i.e., the appropriate ranges of parameter values, to contain the defects in the training folds that are known to belong to the class in question (for a single-class classifier) or to distinguish between different classes (for the multi-class classifier). It then tests these bounds to ascertain whether they correctly classify the defects in the selected testing fold, at a testing step 88. At least some of the tested defects may still be incorrectly classified.

After completing step 88, ADC machine 26 selects another fold to serve as the testing fold, and then repeats steps 86 and 88 iteratively until all folds have been covered in this manner.

ADC machine 26 merges the parameter bounds that were found over the different folds for the single- and multi-class classifiers, at a merging step 90. The different folds give similar training results, due to the equal distribution of defects among different folds. Therefore, the returned confidence values from the different folds can be treated as though they were drawn from the same model. The bounds of the single-class and multi-class classifiers are then jointly adjusted in order to meet the purity and rejection criteria that were provided by the system operator. For example, if the operator demands high purity and is willing to tolerate a high rejection rate, the classifiers will maintain tight bounds. Alternatively, the classifier bounds may be loosened to reduce the rejection rate, at the cost of lower purity. As explained above, the parameter bounds are adjusted by optimizing the confidence thresholds used by the classifiers according to the purity and rejection targets, at a threshold adjustment step 94.

Once the training procedure is completed, and all classifier parameters have been set, ADC machine 26 is ready to apply the classifiers to production wafers, at a production testing step 96. Production testing may follow the method described above with reference to FIG. 3.

Figure 5:
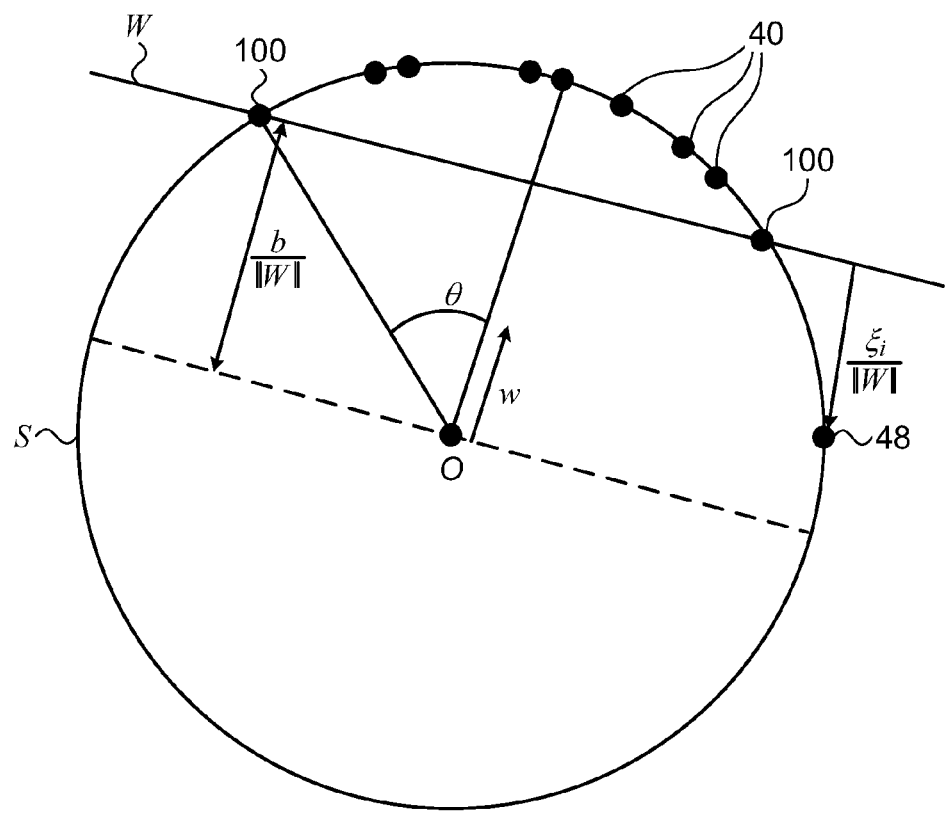
FIG. 5 is a schematic representation of a parameter hyperspace, illustrating a single-class classifier in accordance with an embodiment of the present invention.

FIG. 5 is a schematic representation of a parameter hyperspace, illustrating a single-class classifier used by ADC machine 26, in accordance with an embodiment of the present invention. In this embodiment, the classifier is based on a One-class Support Vector Machine (OSVM) classifier, which produces, for each defect, a probability of belonging to a given class. If the probability is above a certain threshold, the defect is considered to belong to the class. Otherwise, it is classified as unknown.

Support vector machines, including software tools for their implementation, are described by Chih-Chung Chang and Chih-Jen Lin, in "LIBSVM: a library for support vector machines," National Taiwan University (2001); and SVM software developed by these authors is available at www.c-sie.ntu.edu.tw/~cjlin/libsvm. Further information regarding the theory and implementation of SVMs is provided by Vapnik in Statistical Learning Theory (Wiley-Interscience, 1998), and by Schölkopf et al., in "New Support Vector Algorithms," Neural Computation 12 (2000), pages 1207-1245. The above-mentioned publications are incorporated herein by reference.

Alternatively, ADC machine 26 may use other classifier types having this sort of property.

OSVM is a nonlinear kernel-based version of the basic SVM algorithm. Processor 28 uses a Gaussian kernel to transform the input defect data to a high-dimensional space where the classifier is defined. The Gaussian kernel uses nonlinear separators, but within the kernel space it constructs a linear equation. Specifically, processor 28 maps the data to an infinite Euclidean feature space H (a Hilbert space), using a mapping $\Phi: R^d \rightarrow H$. The Gaussian kernel function K for defects $x_i$ and $x_j$ is defined such that $K(x_i, x_j) = \Phi(x_i) \cdot \Phi(x_j) = e^{-\gamma(x_i - x_j)^2}$. Then the single-class confidence value for a given defect x will be $$\sum_{i=1}^{l} \alpha_i K(x_i, x) - b,$$

wherein $\{x_i\}$ is the set of training vectors, and the $\alpha i$ are Lagrange multipliers. Details of this sort of computation and the computation parameter settings are provided in the above references.

FIG. 5 shows the feature space H, in which the training data are mapped on a hypersphere $X(O, R=1)$. The OSVM algorithm defines a hyperplane $W \in H$, which is orthogonal to the radius w of the hypersphere at a distance b from the origin O, i.e., $\langle w, W \rangle H - b = 0$. Defects 40 in the class in question lie on the hypersphere between boundary points 100, which represent the support vectors. During the training phase, processor 28 seeks the support vectors that will give the smallest spherical cap (smallest θ), which is equivalent to maximizing the distance b. After training the OSVM classifier, "unknown" defect 48 will be found to lie on the far side of hyperplane W (in this case by a distance ξi). Changing the confidence threshold is equivalent to changing the value of b.

Figure 6:
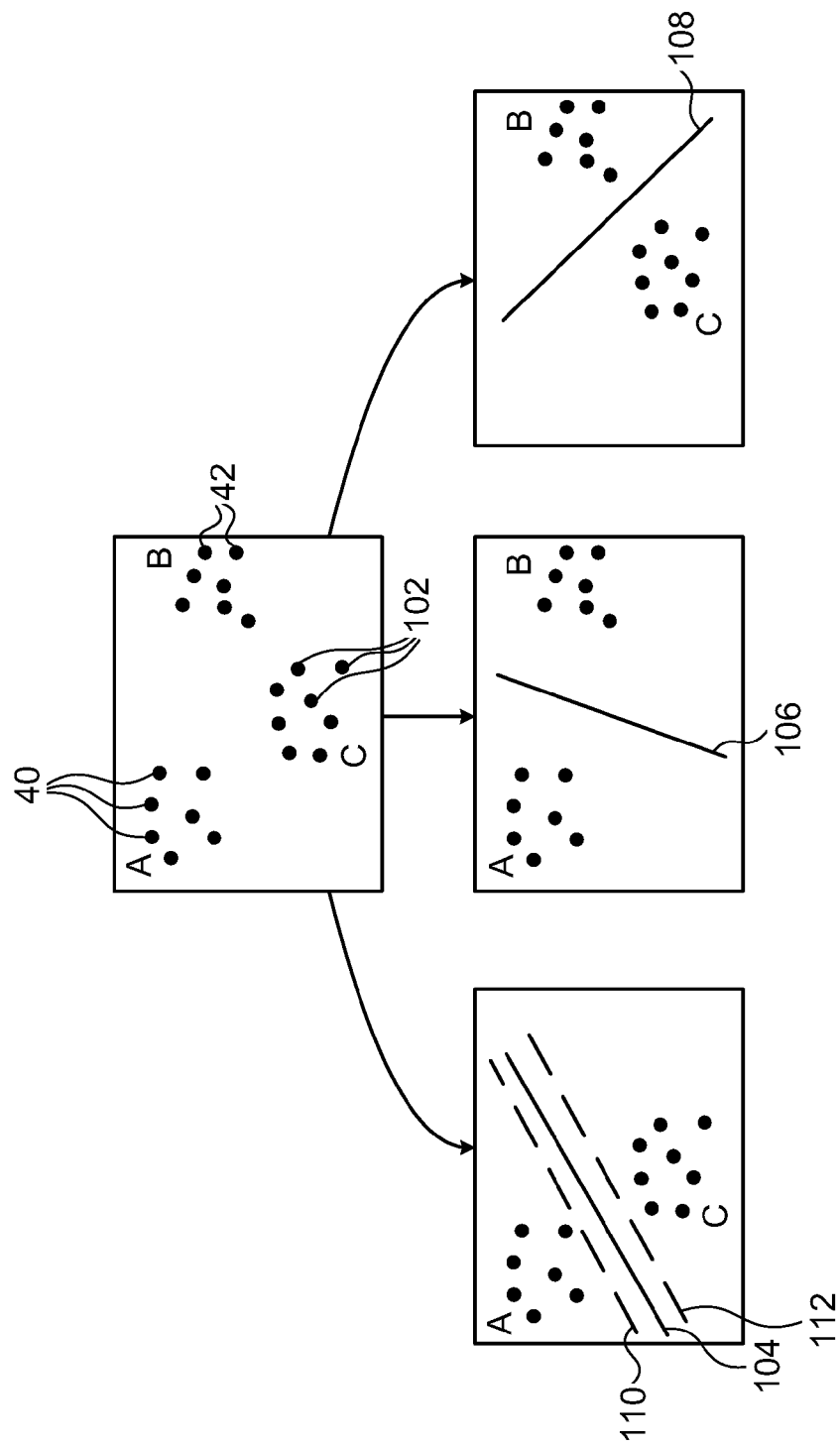
FIG. 6 is a schematic representation of a parameter hyperspace, illustrating a multi-class classifier in accordance with an embodiment of the present invention.

FIG. 6 is a schematic representation of a parameter hyperspace, illustrating a multi-class classifier used by ADC machine 26, in accordance with an embodiment of the present invention. This embodiment also uses support vector machines, in a different way from the OSVM described above. Again, ADC machine 26 may implement the multi-class classifier using other classifier types having suitable properties.

As shown in FIG. 6, the multi-class SVM is a superposition of multiple binary linear SVMs, each of which distinguishes between two classes. Thus, given defects 40, 42 and 102 in classes A, B and C, respectively, ADC machine 26 applies a respective binary SVM to distinguish between each pair of classes. The training procedure finds decision hyperplane boundaries 104, 106 and 108 between the pairs of classes using SVM methodology. Each boundary has a corresponding decision function given by $$\text{sgn}\left(\sum_{j=1}^{n} w_j \cdot x_j + b\right),$$

wherein $$w_j = \sum_{i=1}^{l} y_i \cdot \alpha_i \cdot x_i,$$

and $\{x_i \in R^n | \alpha_i \neq 0\}$ are the support vectors of the boundary, which are found during the training process. Thus, for example, the decision function will be positive on one side of boundary 104 to indicate class A, and negative on the other to indicate class C.

To perform multi-class classification, ADC machine 26 applies each of the binary SVMs in turn (A/C, A/B, and B/C in the pictured example). The classifier chooses the class that receives the most positive votes. If two classes receive the same number of votes, the ADC may compare the relative confidence values for the two classes in order to make the decision.

The binary linear SVM chooses the boundaries 104, 106, 108 that give the largest margins, i.e., the largest distances between the boundary and the nearest members of the training set on either side. Defects falling within these margins may still belong to the class on whose side they are located, but the confidence of classification drops with distance from the boundary. As explained above, ADC machine 26 sets a confidence threshold for distinguishing between defects that are decidable by the multi-class SVM and those that are non-decidable.

Setting the confidence threshold is equivalent to defining hyperplane borders 110 and 112 on either side of boundary 104 in the parameter space. (Similar edges are set for boundaries 106 and 108, but they are omitted from FIG. 6 for the sake of simplicity.) The higher the confidence threshold, the greater will be the distance between borders 110 and 112 and boundary 104—meaning that a larger fraction of defects near the boundary will be rejected as non-decidable, while the likelihood of an erroneous classification will be reduced. On the other hand, reducing the confidence threshold moves borders 110 and 112 closer to boundary 104. The decision borders for each pair of classes may be optimized using the Platt approximation, which fits a sigmoid function to the decision values produced by the SVM. The binary sigmoid distributions are then combined using a least-squares optimization method to give the multi-class confidence estimation. Details of these techniques are described in the above-mentioned references by Chang and Lin.

FIGS. 7A and 7B are bar plots that schematically illustrate defect classification results and a method for setting confidence thresholds with respect to the classification results for a given defect class, in accordance with an embodiment of the present invention. (Each class may have a pair of plots like this one.) The plots are based on test results obtained during the training process: Single-class and multi-class boundaries were found during training over k–1 folds of the training step (step 86 in FIG. 4), and were then tested on the test fold (step 88). Each vertical bar corresponds to one of the defects in the test fold, sorted by confidence of classification. FIG. 7A shows the single-class classification results, while FIG. 7B shows the multi-class classification (and therefore, a given defect in FIG. 7A may appear at a different X-axis location in FIG. 7B).

Based on rejection and purity targets set by the system operator, ADC machine 26 sets cutoff thresholds 120 and 122 in order to achieve the targets. (These thresholds are shown as vertical lines separating between defects, but they could equivalently be represented as horizontal lines at the corresponding confidence threshold levels.) Alternatively, the system operator may set the cutoff thresholds, based on feedback provided by the ADC machine as to the resulting rejection and purity rates.

Defects with single-class confidence values below threshold 120 or with multi-level confidence values below threshold 122 are classified as rejects 124. A given defect may have a high single-class confidence value but be rejected as non-decidable for having low multi-class confidence (or vice versa). For this reason, there are also some rejects 124 in FIG. 7A with confidence above threshold 120. Of the remaining defects above the confidence thresholds, most are true classifications 126, i.e., ADC machine 26 placed them in the proper class. Some false classifications 128 remain above the confidence thresholds.

The rejection rate of ADC machine 26 is given by the number of rejects 124 below threshold 120 and/or threshold 122, while the purity is determined by the number of true classifications 126 out of the total number of non-rejected defects. ADC machine 26 may adjust thresholds 120 and 122 jointly, using search and optimization methods known in the art, until the optimal setting is found, in accordance with the operator's rejection and purity targets. For example, in the case shown in FIGS. 7A and 7B, the purity of the classification results is 94%, with a rejection rate of 15%. If only one type of classifier were used (single-class or multi-class), this level of purity could be achieved only at the expense of a much higher rejection rate.

Although the above embodiments use specific types of classifiers that the inventors have found to be useful in handling semiconductor wafer defects, the principles of the present invention may similarly be applied using classifiers of other types, and in other inspection applications, as well. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "creating," "identifying," "causing" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

Thus, a method and apparatus for defect analysis has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method for defect analysis, comprising:
   identifying, by a computer system, respective single-class classifiers for a plurality of defect classes, the plurality of defect classes characterized by respective ranges of inspection parameter values, each single-class classifier being configured for a respective class to identify defects belonging to the respective class based on the inspection parameter values, while identifying the defects not in the respective class as unknown defects;
   identifying, by the computer system, a multi-class classifier configured to assign each defect to one of the plurality of the defect classes based on the inspection parameter values;
   receiving, by the computer system inspection data with respect to a defect found in a sample; and
   automatically applying both the single-class and multi-class classifiers to the inspection data, using the computer system, to assign the defect to one of the defect classes.

2. The method according to claim 1, wherein the multi-class classifier is configured to identify the defects in an overlap region between the respective ranges of at least two of the defect classes as non-decidable defects.

3. The method according to claim 2, and comprising rejecting from classification the unknown defects and the non-decidable defects.

4. The method according to claim 2, wherein specifying the respective single-class and multi-class classifiers comprises jointly setting respective confidence thresholds for distinguishing between known and unknown defects and between decidable and non-decidable defects.

5. The method according to claim 4, wherein setting the respective confidence thresholds comprises adjusting the confidence thresholds to achieve a specified purity target in classification of the defects.

6. The method according to claim 1, wherein automatically applying both the single-class and multi-class classifiers comprises classifying the defect in a given defect class using the multi-class classifier, and verifying that the defect is classified as a known defect by the single-class classifier for the given defect class.

7. The method according to claim 1, wherein specifying the multi-class classifier comprises defining a plurality of decision planes for distinguishing between the respective ranges of the parameter values in a parameter hyperspace for different pairs of the defect classes, and wherein applying the multi-class classifier comprises aggregating multiple binary decisions made with respect to the decision planes.

8. The method according to claim 7, wherein defining the decision planes comprises, for each pair of the defect classes, applying a binary linear support vector machine in order to find a plane giving a maximal separation of the classes in the pair.

9. The method according to claim 1, wherein specifying the respective single-class classifiers comprises defining a one-class support vector machine to distinguish between the defects in a given class and the defects that are classified as unknown defects with respect to the given class.

10. The method according to claim 9, wherein defining the one-class support vector machine comprises mapping the inspection data to a hypersphere in a parameter hyperspace, and finding a hyperplane that cuts the hypersphere to define a hyperspherical cap containing the defects to be classified as belonging to the given class.

11. The method according to claim 1, wherein specifying the respective single-class and multi-class classifiers comprises applying the single-class and multi-class classifiers to a set of training data in order to define the respective ranges of the inspection parameter values for use in applying the single-class and multi-class classifiers to the inspection data.

12. A method for analyzing defects, comprising:
   defining, by a computer system, a plurality of defect classes;
   receiving, by the computer system, a training set comprising inspection data with respect to defects that have been classified as belonging to respective defect classes;
   training, by the computer system, a plurality of classifiers using the training set to define a respective range of inspection parameter values that characterizes each defect class and, using the parameter values, to classify each defect as belonging to a respective class with a respective level of confidence;
   adjusting, by the computer system, a confidence threshold for rejection of defect classifications having low levels of confidence to achieve a specified purity target in classification of the training set; and
   applying, by the computer system, the trained classifiers with the adjusted confidence threshold to further inspection data outside the training set, wherein the plurality of classifiers comprises:
- a multi-class classifier, having a first confidence threshold such that the defects classified by the multi-class classifier as falling below the first confidence threshold are identified as non-decidable defects; and
- at least one single-class classifier, having a second confidence threshold such that defects classified by the at least one single-class classifier as falling below the second confidence threshold are identified as unknown defects.

13. The method according to claim 12, wherein training the one or more computerized classifiers comprises training a plurality of classifiers, having respective confidence thresholds that are jointly adjusted to balance a purity of the classification against a rejection rate.

14. The method according to claim 13, wherein adjusting the confidence threshold comprises maximizing the purity of the classification of the training set while keeping the rejection rate no greater than a predetermined maximum.

15. The method according to claim 12, wherein training the one or more computerized classifiers comprises:
- dividing the training set into multiple folds; deriving the range of inspection parameter values based on a training subset of the folds;
- testing the derived range on a testing subset of the folds, disjoint from the training subset; and repeating the steps of deriving and testing over multiple, different training and
- testing subsets of the folds.

16. Apparatus for defect analysis, comprising:
- a memory, configured to store respective ranges of inspection parameter values for a plurality of defect classes; and
- a processor, which is configured to receive inspection data with respect to a defect found in a sample, and to apply both single-class and multi-class classifiers to the inspection data, based on the inspection parameter values, to assign the defect to one of the defect classes,
- wherein each single-class classifier is configured for a respective class to identify defects belonging to the respective class, while identifying the defects not in the respective class as unknown defects, and the multi-class classifier is configured to assign each defect to one of the plurality of the defect classes.

17. The apparatus according to claim 16, wherein the multi-class classifier is configured to identify the defects in an overlap region between the respective ranges of at least two of the defect classes as non-decidable defects.

18. The apparatus according to claim 17, wherein the processor is configured to reject from classification the unknown defects and the non-decidable defects.

19. The apparatus according to claim 17, wherein confidence thresholds for distinguishing between known and unknown defects and between decidable and non-decidable defects are set jointly for the single-class and multi-class classifiers.

20. The apparatus according to claim 19, wherein the confidence thresholds are adjusted to achieve a specified purity target in classification of the defects.

21. The apparatus according to claim 16, wherein the processor is configured to classify the defect in a given defect class using the multi-class classifier, and to verify that the defect is classified as a known defect by the single-class classifier for the given defect class.

22. The apparatus according to claim 16, wherein the multi-class classifier is configured to apply a plurality of decision planes for distinguishing between the respective ranges of the parameter values in a parameter hyperspace for different pairs of the defect classes, and to aggregate multiple binary decisions made with respect to the decision planes.

23. The apparatus according to claim 22, wherein the decision planes are defined, for each pair of the defect classes, by applying a binary linear support vector machine in order to find a plane giving a maximal separation of the classes in the pair.

24. The apparatus according to claim 16, wherein each of the single-class classifiers is configured to apply a one-class support vector machine to distinguish between the defects in a given class and the defects that are classified as unknown defects with respect to the given class.

25. The apparatus according to claim 24, wherein the one-class support vector machine is operative to map the inspection data to a hypersphere in a parameter hyperspace, and to find a hyperplane that cuts the hypersphere to define a hyperspherical cap containing the defects to be classified as belonging to the given class.

26. The apparatus according to claim 16, wherein the respective ranges of the inspection parameter values for the single-class and multi-class classifiers are defined by applying the single-class and multi-class classifiers to a set of training data.

27. Apparatus for analyzing defects, comprising:
- a memory, which is configured to store information with respect to a plurality of defect classes; and
- a processor, which is configured to receive a training set comprising inspection data with respect to defects that have been classified as belonging to respective defect classes, to train a plurality of classifiers using the training set to define a respective range of inspection parameter values that characterizes each defect class and, using the parameter values, to classify each defect as belonging to a respective class with a respective level of confidence, to adjust a confidence threshold for rejection of defect classifications having low levels of confidence to achieve a specified purity target in classification of the training set, and to apply the trained classifiers with the adjusted confidence threshold to further inspection data outside the training set, wherein the plurality of classifiers comprises:
  - a multi-class classifier, having a first confidence threshold such that the defects classified by the multi-class classifier as falling below the first confidence threshold are identified as non-decidable defects; and
  - at least one single-class classifier, having a second confidence threshold such that defects classified by the at least one single-class classifier as falling below the second confidence threshold are identified as unknown defects.

28. The apparatus according to claim 27, wherein the one or more classifiers comprise a plurality of classifiers, having respective confidence thresholds that are jointly adjusted to balance a purity of the classification against a rejection rate.

29. The apparatus according to claim 28, wherein the processor is configured to adjust the confidence threshold to maximize the purity of the classification of the training set while keeping the rejection rate no greater than a predetermined maximum.

30. The apparatus according to claim 27, wherein the processor is configured to train the one or more classifiers by dividing the training set into multiple folds, deriving the range of inspection parameter values based on a training subset of the folds, testing the derived range on a testing subset of the folds, disjoint from the training subset, and repeating the steps of deriving and testing over multiple, different training and testing subsets of the folds.

31. A computer readable storage medium including instructions that, when executed by a processing device, cause the processing device to implement a method for defect analysis, the method comprising:
   identifying, by a computer system, respective single-class classifiers for a plurality of defect classes, the plurality of defect classes characterized by respective ranges of inspection parameter values, each single-class classifier being configured for a respective class to identify defects belonging to the respective class based on the inspection parameter values, while identifying the defects not in the respective class as unknown defects;
   identifying, by the computer system, a multi-class classifier configured to assign each defect to one of the plurality of the defect classes based on the inspection parameter values;
   receiving, by the computer system inspection data with respect to a defect found in a sample; and
   automatically applying both the single-class and multi-class classifiers to the inspection data, using the computer system, to assign the defect to one of the defect classes.

32. The computer readable storage medium according to claim 31, wherein the multi-class classifier is configured to identify the defects in an overlap region between the respective ranges of at least two of the defect classes as non-decidable defects.

33. The computer readable storage medium according to claim 32, the method further comprising rejecting from classification the unknown defects and the non-decidable defects.

34. The computer readable storage medium according to claim 32, wherein confidence thresholds for distinguishing between known and unknown defects and between decidable and non-decidable defects are set jointly for the single-class and multi-class classifiers.

35. The computer readable storage medium according to claim 34, wherein the confidence thresholds are adjusted to achieve a specified purity target in classification of the defects.

36. The computer readable storage medium according to claim 31, wherein the method further comprising classifying the defect in a given defect class using the multi-class classifier, and verifying that the defect is classified as a known defect by the single-class classifier for the given defect class.

37. The computer readable storage medium according to claim 31, wherein the multi-class classifier is configured to apply a plurality of decision planes for distinguishing between the respective ranges of the parameter values in a parameter hyperspace for different pairs of the defect classes, and to aggregate multiple binary decisions made with respect to the decision planes.

38. The computer readable storage medium according to claim 37, wherein the decision planes are defined, for each pair of the defect classes, by applying a binary linear support vector machine in order to find a plane giving a maximal separation of the classes in the pair.

39. The computer readable storage medium according to claim 31, wherein each of the single-class classifiers is configured to apply a one-class support vector machine to distinguish between the defects in a given class and the defects that are classified as unknown defects with respect to the given class.

40. The computer readable storage medium according to claim 39, wherein the one-class support vector machine is operative to map the inspection data to a hypersphere in a parameter hyperspace, and to find a hyperplane that cuts the hypersphere to define a hyperspherical cap containing the defects to be classified as belonging to the given class.

41. The computer readable storage medium according to claim 31, wherein the respective ranges of the inspection parameter values for the single-class and multi-class classifiers are defined by applying the single-class and multi-class classifiers to a set of training data.

42. A computer readable storage medium including instructions that, when executed by a processing device, cause the processing device to implement a method for defect analysis, the method comprising:
   defining, by a computer system, a plurality of defect classes;
   receiving, by the computer system, a training set comprising inspection data with respect to defects that have been classified as belonging to respective defect classes;
   training, by the computer system, one or more computerized classifiers using the training set to define a respective range of inspection parameter values that characterizes each defect class and, using the parameter values, to classify each defect as belonging to a respective class with a respective level of confidence;
   adjusting, by the computer system, a confidence threshold for rejection of defect classifications having low levels of confidence to achieve a specified purity target in classification of the training set; and
   applying, by the computer system, the trained classifiers with the adjusted confidence threshold to further inspection data outside the training set.

43. The computer readable storage medium according to claim 42, wherein the one or more classifiers comprise a plurality of classifiers, having respective confidence thresholds that are jointly adjusted to balance a purity of the classification against a rejection rate.

44. The computer readable storage medium according to claim 43, wherein the plurality of the classifiers comprise:
   a multi-class classifier, having a first confidence threshold such that the defects classified by the multi-class classifier as falling below the first confidence threshold are identified as non-decidable defects; and
   at least one single-class classifier, having a second confidence threshold such that defects classified by each single-class classifier as falling below the second confidence threshold are identified as unknown defects.

45. The computer readable storage medium according to claim 43, the method further comprising adjusting the confidence threshold to maximize the purity of the classification of the training set while keeping the rejection rate no greater than a predetermined maximum.

46. The computer readable storage medium according to claim 42, the method further comprising training the one or more classifiers by dividing the training set into multiple folds, deriving the range of inspection parameter values based on a training subset of the folds, testing the derived range on a testing subset of the folds, disjoint from the training subset, and repeating the steps of deriving and testing over multiple, different training and testing subsets of the folds.

* * * * *